United States Patent [19]
Miller

[11] 3,787,956
[45] Jan. 29, 1974

[54] HOSE MANUFACTURE
[75] Inventor: Glenn A. Miller, Lincoln, Nebr.
[73] Assignee: The Goodyear Tire & Rubber Company, Akron, Ohio
[22] Filed: Dec. 22, 1971
[21] Appl. No.: 210,828

[52] U.S. Cl. .................................. 29/451, 29/227
[51] Int. Cl. ............................................ B23p 19/04
[58] Field of Search ..... 29/454, 446, 234, 227, 456, 29/235, 451; 156/143, 144, 148

[56] References Cited
UNITED STATES PATENTS

| | | | |
|---|---|---|---|
| 2,329,286 | 9/1943 | Meyer | 29/234 |
| 2,734,262 | 2/1956 | Briegel | 29/227 |
| 2,298,183 | 10/1942 | Susen | 29/235 |
| 2,760,393 | 8/1956 | Stough | 29/240 |
| 2,474,967 | 7/1949 | Bachleda | 29/234 |
| 2,961,749 | 11/1960 | Brown, Jr. et al. | 29/451 |
| 2,210,061 | 8/1940 | Caminez | 29/227 |
| 2,097,022 | 10/1937 | Donahue | 29/456 |

Primary Examiner—Richard J. Herbst
Attorney, Agent, or Firm—F. W. Brunner and R. S. Washburn

[57] ABSTRACT

Method and apparatus for making hose, particularly for automotive use, in which a helical coil of stiff resilient wire is inserted and expanded into secure but non-adhered contact with the inside surface. The coil before or during insertion into the hose is reduced in diameter by effecting opposite rotations of spaced portions or turns of the coil.

4 Claims, 9 Drawing Figures

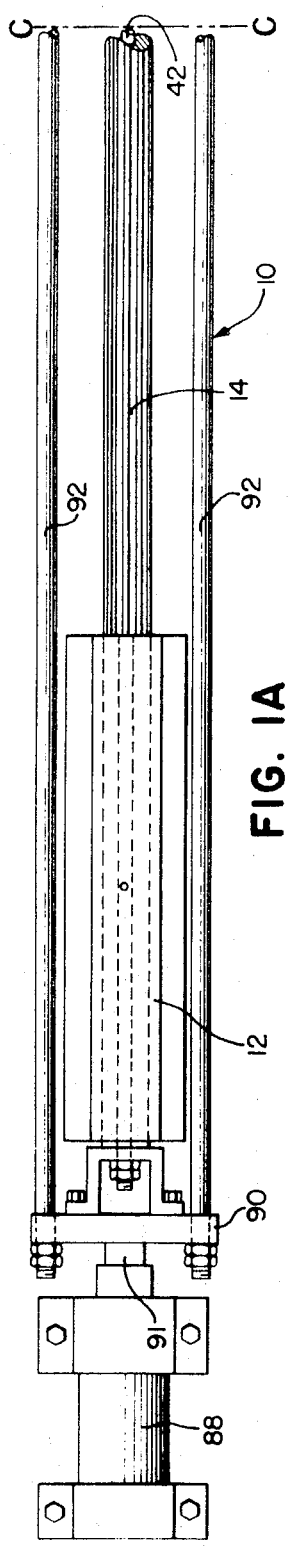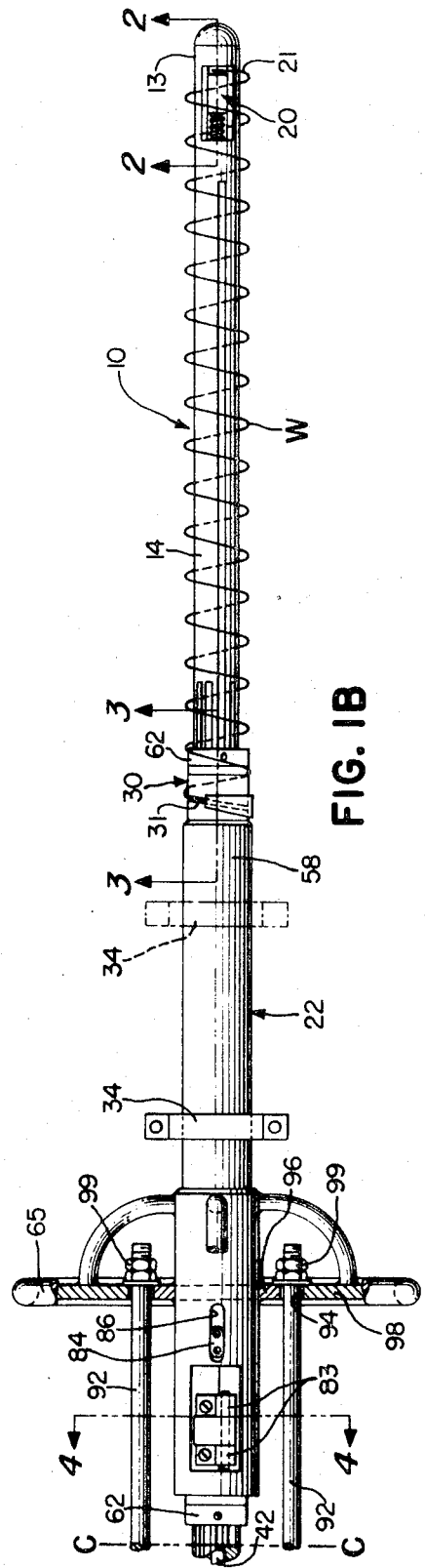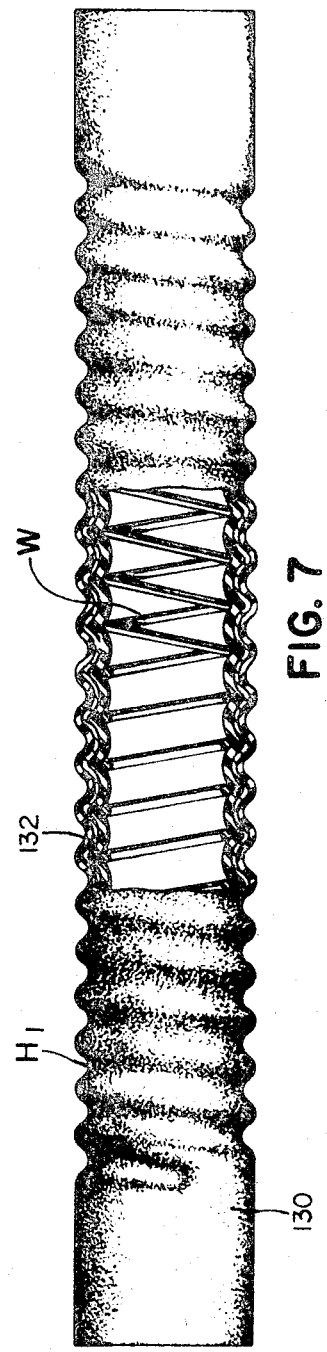
FIG. 1A
FIG. 1B
FIG. 7

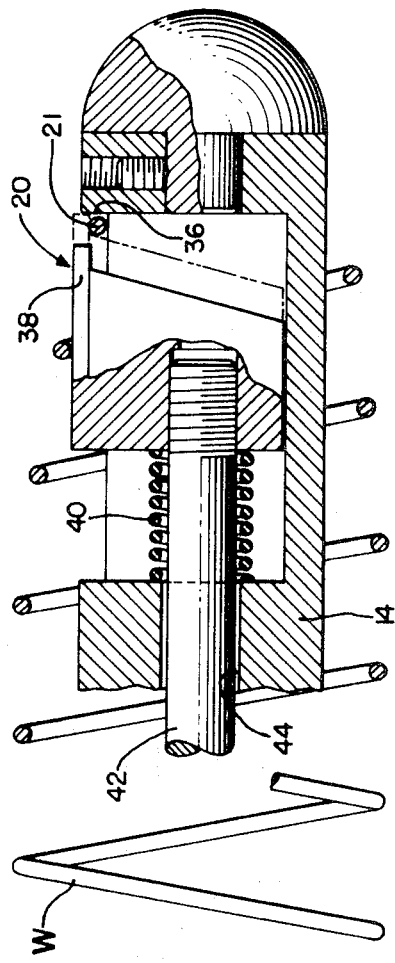
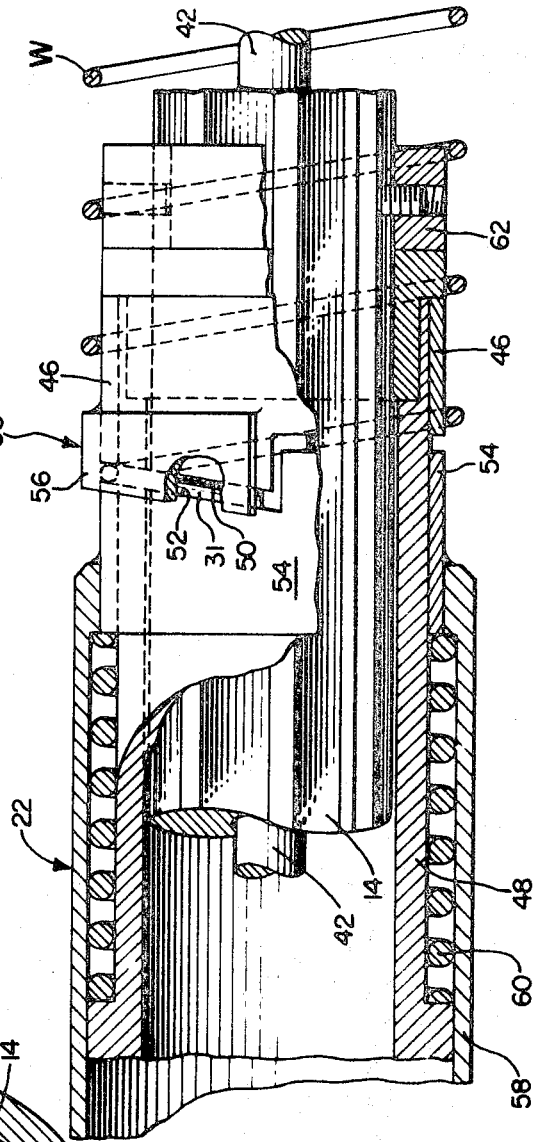
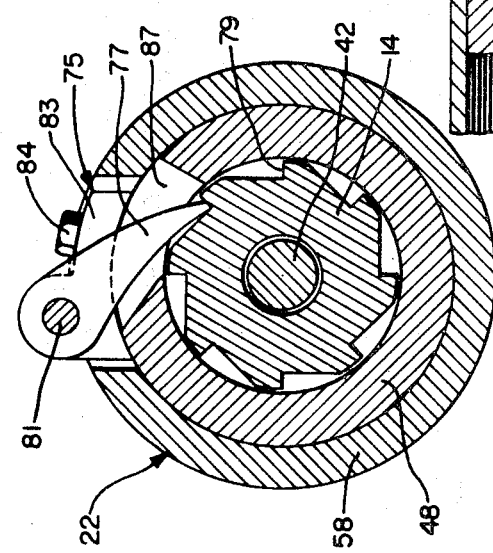
FIG. 2
FIG. 3
FIG. 4

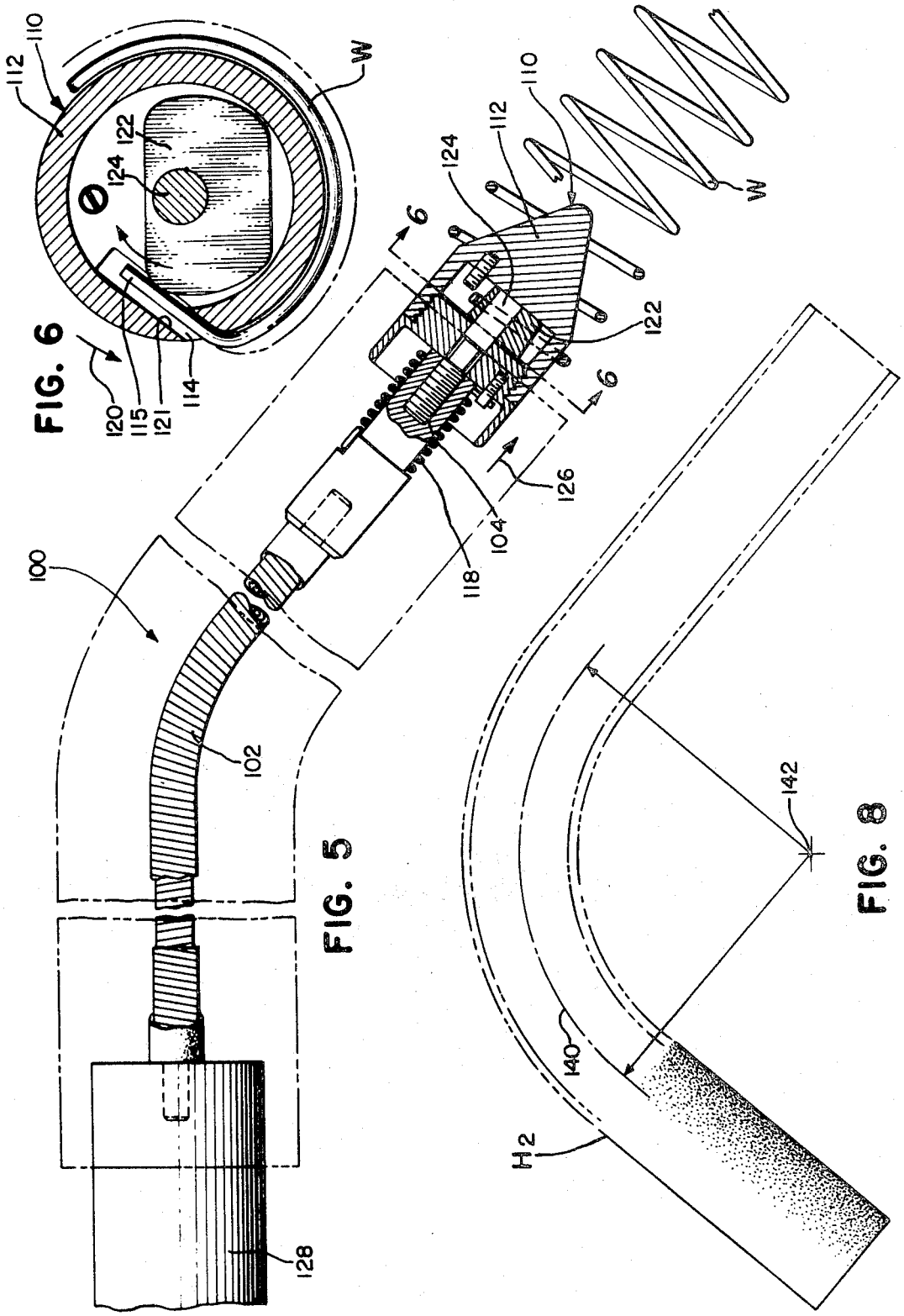

HOSE MANUFACTURE

The foregoing abstract is not to be taken as limiting the invention of this application, and in order to understand the full nature and extent of the technical disclosure of this application, reference must be made to the accompanying drawing and the following detailed description.

This invention relates to the manufacture of hose, particularly molded rubber hose, and still more particularly to methods of and apparatus for making hose having therewithin a wound helical coil of stiff resilient metal wire.

It is well known to employ hose to move fluids at pressures differing from the pressure of the surrounding atmosphere. Hose of various kinds is used also to convey fluids in which the pressure may vary from above atmospheric to below atmospheric. A representative service for hose of the types with which the present invention is concerned is that of conveying fluids in a liquid cooled automotive engine cooling system. Molded rubber hose for automotive cooling system service commonly comprises a tubular body of rubber or rubber-like material having tubular knit or other fabric or like material embedded therewithin in order to resist internal pressures greater than the surrounding atmosphere. In modern automotive service such pressures may range from 1½ to 3 or more atmospheres. An additional requirement, however, in automotive type hose is that of resisting a tendency to collapse hose at the suction side of the coolant pump or during idle periods of the engine during which the fluid cools so as to reduce pressure within the system considerably below normal atmospheric pressure.

To reinforce such hose against collapse in the event of sub-atmospheric pressure therewithin, it has been a practice to incorporate within the body of the hose, a plurality of rings, or more commonly a helical coil of stiff resilient metal wire. Corrosion of the wire was avoided since the wire was encased by the rubber. While hose manufactured with stiff resilient wire incorporated within the tubular body has performed very satisfactorily in service, the manufacture thereof has been relatively expensive. It is also known practice to insert into the hose a reinforcing coil of wire which is retained therein only by corrugations formed in the inner surface of the hose, using corrosion resistant wire.

This invention, therefore, aims to produce such hose at lower cost.

A primary object is to provide methods and apparatus for making hose of the character described in which the plurality of turns or the helical coil of stiff resilient metal wire is retained within the hose by an elastic diametral expansion of each of the several turns radially outwardly into engagement with the respectively associated inward surfaces of the hose which engagement can suffice to retain the wire therein.

An additional object of the invention is the provision of methods and apparatus for inserting within a hose of the character described, the same having been cured or being in the green or uncured state, an inserted reinforcement comprising a plurality of turns of resilient metal wire in an expeditious and economical manner, as well as to avoid embedding the wire within the rubber of the hose.

The foregoing as well as other objects and advantages which will become apparent or be particularly pointed out as the description proceeds, is accomplished in accordance with the invention by elastically reducing the diameter of at least a portion of the turns of a helical coil of wire, moving one of said hose and said coil longitudinally of and into longitudinal registry with the other, and elastically reexpanding said turn or turns sufficiently to engage the coil with the interior surface of the hose. Apparatus in accordance with the invention includes means for rotating at least a portion of said coil about its own axis and relatively of the other portion, and means, operatively connected to said means for rotating, for gripping at least one turn of said coil and entering said at least one turn into said hose.

In the description which follows of certain preferred embodiments of the invention being claimed herein, reference is made to the attached drawings in which:

FIGS. 1A and 1B present a plan view of apparatus embodying the invention, the view being divided at the line C—C;

FIG. 2 is a section view of a portion of the apparatus of FIGS. 1A and 1B oriented as indicated by the lines 2—2 in FIG. 1B;

FIG. 3 is a section view of another portion of the apparatus of FIGS. 1A and 1B taken as indicated by the lines 3—3 in FIG. 1B;

FIG. 4 is a section view of another portion of the apparatus of FIGS. 1A and 1B taken as indicated by the lines 4—4 in FIG. 1B;

FIG. 5 is a plan view of another apparatus embodying the invention;

FIG. 6 is a section view taken as indicated by the lines 6—6 of FIG. 5; and

FIGS. 7 and 8 are views of hose made by the methods and/or apparatus according to the invention.

It is believed that both method and apparatus in accordance with the invention will be more fully understood by proceeding first with the description of the apparatus 10 illustrated in FIGS. 1A and 1B. The apparatus 10 includes a support member 12 which is secured to any suitable support (not shown) at a height convenient for an operator. Shaft means in the form of an edongated shaft 14 extends longitudinally through the support member 12 and is adjustably fixed therein. Means 20 for gripping at least one turn 21 of helical coil W of reinforcement wire, which means will be described in greater detail in connection with FIG. 2, is mounted in the unsupported outward end 13 of the shaft 14. Sleeve means comprising the sleeve assembly 22 is mounted coaxially of the shaft 14 and can be rotated, in one rotational sense only, about the shaft 14. A second gripping means 30 for gripping a second turn 31 of the helical coil W is mounted at the end of the sleeve assembly 22 toward the right as seen in FIG. 1B. As presently will appear in greater detail, a hose in which the wire reinforcement coil W is to be inserted will be manually moved over the outwardly extending shaft 14 and located axially in appropriate registry with the coil W by being abutted against the stop 34 which is adjustably fixed on the exterior of the sleeve assembly 22.

Referring also to FIG. 2; the gripping means 20 includes one element 36 which is fixed on the shaft 14 and a movable element 38 between which elements a portion of the first turn 21 of the coil W is held. The element 38 is urged toward the wire of the turn 21 by a compression spring 40 disposed co-axially about the pull rod 42 which is longitudinally reciprocably mounted and extends thrugh the bore 44 of the shaft 14.

The second gripping means 30 is best illustrated in FIG. 3 and comprises an element 46 fixed on the inner sleeve member 48. A wire engaging face 50 of the element 46 extends at an angle corresponding to the helical angle of the turn 31 of the coil W, and is opposed by a face 52 on the gripping element 54 of the gripping means 30. An arcuate cover plate 56, secured to the outer cylindrical surface of the element 46 overlies an end of the last turn 31 of the coil W. The element 54 is fixed to the outer sleeve member 58, and moves axially therewith. The sleeve member 58 is urged axially to the right in FIGS. 1B and 3 by a compression spring 60, relative to the inner sleeve member 48 thereby urging the face 52 toward the face 50 to grip the wire end 31. The member 48 is adjustably fixed in lengthwise location on the shaft 14, by the common set collars 62, to suit the length of hose to be processed.

With the first (21) and last (31) turns of the helical coil W gripped respectively by the first and second gripping means, the sleeve assembly 22 can be rotated by the handwheel 65 which is secured coaxially on the sleeve member 58 to rotate the second turn 31 with respect to the first, 21, and thereby elastically reduce the diameter of the wire coil W. When the coil W is reduced sufficiently in diameter, a hose is threaded over the coil W and the shaft 14, into axial registry with the coil as predetermined by the stop 34, whereupon the respective gripping means are opened and the coil W is elastically reexpanded into engagement with the inner surface of the hose and the assembled hose is then readily removed from the shaft.

The free diameter of the coil W is equal to or greater than the diameter defined by the peaks of the corrugations in the inner surface of the hose which is herein called the inside diametral measure.

Turning now to FIG. 4; to control rotation of the sleeve assembly 22 with respect to the shaft 14 and particulary to prevent reverse rotation which would permit the coil W to reexpand prematurely, a ratcheting device 75 is mounted on the sleeve member 48. The pawl 77 is urged by a spring (not shown) into engagement with ratchet teeth 79 provided on the shaft 14. The teeth 79 are spaced about and extend continuously along the shaft so as to provide for suitable lengthwise adjustment of the assembly 22 to accommodate differing lengths of hose. The pawl 77 pivots about the pin 81 and is urged into engagement with the respective teeth 79 by the spring. The rotation of the sleeve assembly 22 is controlled by the ratcheting device so as to permit rotation in a direction to decrease the diameter of the coil W and to prevent rotation in a direction which would permit increase in diameter of that coil. The pin 81 is carried in a pair of blocks 83 secured in the assembly 22 by cap screws 84, so that the pawl 77 extends through the opening 87 into operating engagement with the teeth 79. The device 75 is fixed in the sleeve assembly 22 so as to provide for relative axial movement between the sleeve members 48 and 58.

The outer sleeve member 58 is slidable coaxially of the inner sleeve member 48 sufficiently to permit opening and closing of the second gripping means and is constrained to rotate together with the inner sleeve member 48 by the key 84 which is secured to the member 48 and is longitudinally slidable in the key slot 86 formed in the member 58.

Turning again to FIGS. 1A and 1B; means for actuating the respective gripping means is provided in the form of a fluid power cylinder 88 fixed with respect to the support means 12 and having a yoke 90 secured to the piston rod 91. The previously mentioned pull rod 42 which is connected to the element 38 of the first gripping means 20 is fixed to the yoke 90. A pair of pull rods 92 also fixed to the yoke 90 extend longitudinally parallel to the shaft 14 freely through the annular slot 94 formed between the flange 96 fixed on the member 58 and the ring 98 fixed to the handwheel 65. Operation of the cylinder 88 to withdraw the rod 91 inwardly moves the pull rod 42 toward the left, as seen in the drawings, and by engaging the nuts 99 with the flange 96 and the ring 98, also moves the member 58 toward the left and so causes the movable elements 38 and 54 of each of the respective gripping means to be opened to receive the respective turns 21 and 31 of the wire coil W. Operation of the cylinder 88 to extend the piston rod outwardly permits each of the movable elements 38 and 54 to be moved by the springs 40 and 60, toward the right in the drawings, in a direction to grip the respective turns of the wire coil.

The invention is further illustrated by apparatus 100, as seen in FIGS. 5 and 6. In the apparatus 100, means for rotating at least one turn of the wire reinforcement coil W is provided in the form of a shaft 102, at the outward unsupported end 104 of which is mounted a wire gripping means 110 comprising a head 112 having an opening 114 for receiving and holding therein one end of the coil W. The opening 114 extends axially of and angularly with respect to the periphery of the head to accommodate the inwardly bend end 115 of the coil W. The head 112 can be rotated manually against the torque applied by the torsion spring 118 to admit the end 115. Upon release of the head 112, the torsion spring rotates the head and the wire end, in the direction of the arrow 120 so as to grip the wire end 115 between the surface 121 of the head and the gripping element 122 which is mounted corotatably with the shaft 102 on the stud 124. The hose, previously placed about the shaft 102, is then moved manually toward the head 112, arrow 126, to engage the coil W while the shaft is rotated by the spindle and collet 128. Held by the gripping means 110, the coil is rotated with the shaft 102. As each successive turn of the coil W comes into engagement with the inner surface of the hose, its diameter is reduced by the relative rotation of the turn fixed in the gripping means and the portion frictionally engaged by the hose. In this manner, the coil is moved longitudinally into axial registry with the hose as the hose is moved off the shaft 102, somewhat in the manner of a bolt entering a threaded nut.

It will be apparent that the coil W can as well be placed about the shaft 102 with an end turn thereof gripped in the head 112 in the same way. In this latter procedure, the hose is then manually moved longitudinally of the shaft toward the collet 128 whereupon the coil is entered into the hose in the same manner. The shaft means 102 is shown in the form of a conventional flexible shaft. The capacity of the shaft means 102 to rotate while conforming to a curve accommodates hose molded in predetermined curved form. The shaft means can, particularly for hose formed without axial curvature, be a common rigid straight shaft.

FIGS. 7 and 8 illustrate two types of hose made in the practice of the invention. Referring particularly to FIG. 7, the hose H₁ comprises a tube 130 having layers of rubber or rubber-like material with one or more layers of a fabric reinforcing material 132 embedded therein in the usual manner. A still resilient metal wire is disposed within the hose in the form of a single helically wound coil W. The turns of the wire coil are not embedded in the rubber or rubber-like material of the hose but on the other hand are retained in the hose by frictional, but non-adhesive, surface engagement. In particular, the hoe is formed with corrugations extending generally about the axis such that each turn of wire is received in a corresponding groove of the corrugation. Corrugation can be formed conveniently in the manner of a screw thread corresponding to the pitch of the helix of the coil W such that the helix of the coil conformsto the helical groove of the corrugations.

While it will be apparent that the coil may be inserted into the hose prior to the curing thereof, by heat and pressure in the usual manner, it has been found advantageous to effect cure of the hose before the wire reinforcement is inserted therein. It will also be apparent that hose may be molded in various forms. For example, the inner wall of the hose may be cylindrical, that is, with smaller corrugations or even without substantial corrugation. In this event, the several turns of wire or the helical coil of wire reinforcement are elastically reduced in diameter, then placed in axial registry within the tube, and permitted to reexpand elastically into firm and secure engagement with the inner surface of the hose. In this arrangement, the free diameter of the coil is made larger than the inside diameter or diametral measure of the hose by approximately ten percent and in any case between about three percent and about sixteen percent. There is then a tendency in the coil to expand toward its free diameter which tendency is restrained by the hose with the result that the coil tends to form mirror corrugations sufficient to secure the insert within the hose.

The hose H₂, illustrated in FIG. 8, being a tube of rubber or rubber-like material, in which there is embedded a fabric reinforcing sleeve in the usual manner, is formed or molded about an axis 140 having a curvature about one or more centers 142 of curvature disposed outwardly of the hose. It will be understood that curved hose such as the hose H₂ illustrated may have a single curvature or a plurality of curvatures dependent upon the dimensions and arrangement of the automotive engine or other apparatus with which it is to be used.

It will be apparent that the apparatus 100 is particularly adapted for inserting a coil W into the hose H₂, in the manner described.

While certain representative embodiments and deails have been shown for the purpose of illustrating the invention, it will be apparent to those skilled in the art that various changes and modifications may be made therein without departing from the spirit or scope of the invention.

What is claimed is:

1. The process of making a hose having therewithin a previously wound helical coil of stiff resilient metal wire comprising gripping only a portion of a single end turn of said coil, then engaging respective surfaces of said hose and of said coil in frictional contact with each other and rotating one of said hose and said coil relatively of the other while pulling said coil longitudinally into said hose so as to elastically reduce the diameter of said coil one turn at a time relative to the inside diametral measure of said hose, and then releasing said portion of the coil after the coil is in place in said hose.

2. The method of claim 1, wherein said hose is in its cured state and curved in at least a portion of its length about a center spaced outwardly from its own longitudinal axis, and said moving includes displacing portions of the axial length of said coil successively and angularly with respect to remaining portions of the length thereof.

3. Apparatus for making a hose having therewithin a helical coil of stiff, resilient wire comprising fixedly mounted rotating means including shaft means having a free end and accommodating rotational and longitudinal movement relatively thereover between said shaft means and said hose for rotating a selected one of said hose and said coil about a common longitudinal axis, gripping means for gripping only a portion of a single end turn of said coil corotatably mounted on said free end and operable to engage respective surfaces of said hose and said coil in frictional contact with each other while pulling said coil spirally into said hose.

4. Apparatus as claimed in claim 3, said shaft means comprising a single flexible shaft.

* * * * *